Feb. 20, 1951 L. G. TATRO 2,542,164
FLASH LAMP IGNITER AND SHUTTER SYNCHRONIZER
Filed Aug. 31, 1946 3 Sheets-Sheet 1
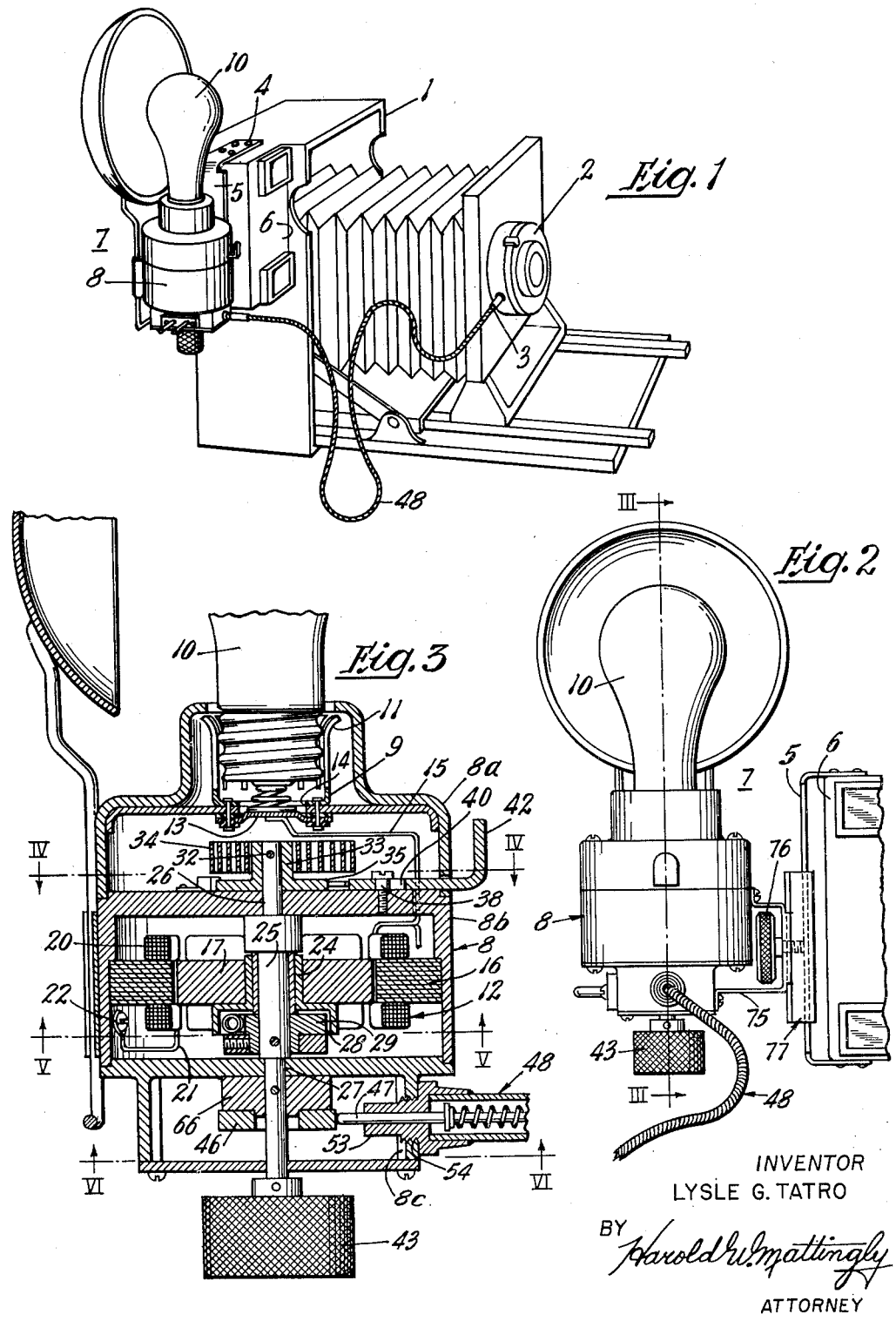
INVENTOR
LYSLE G. TATRO
BY Harold W. Mattingly
ATTORNEY Feb. 20, 1951 L. G. TATRO 2,542,164
FLASH LAMP IGNITER AND SHUTTER SYNCHRONIZER
Filed Aug. 31, 1946 3 Sheets-Sheet 2
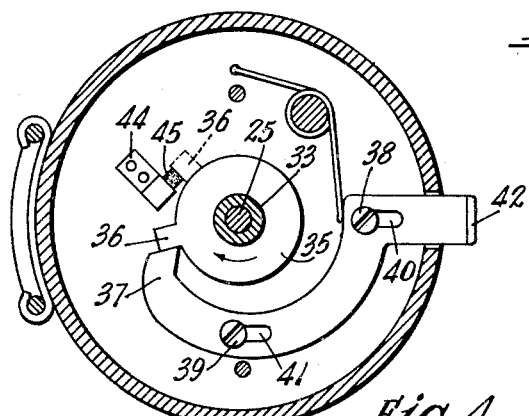
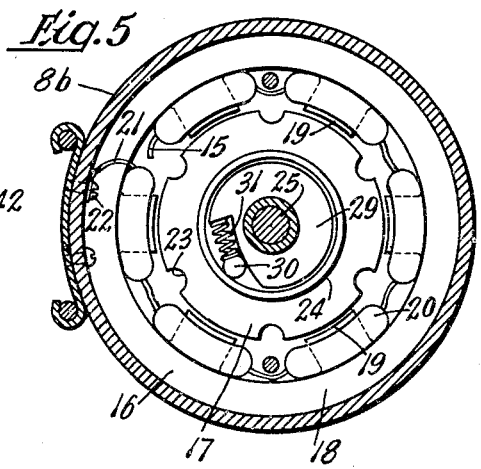
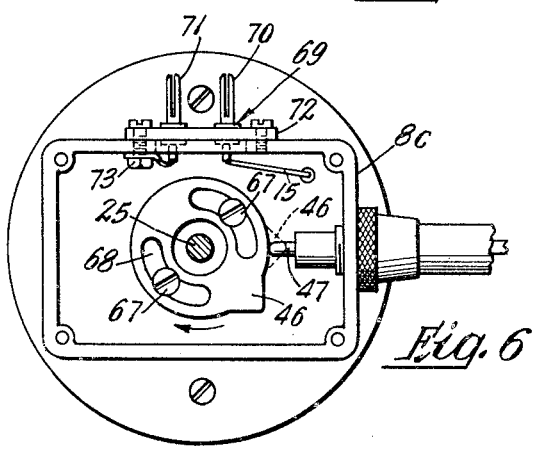
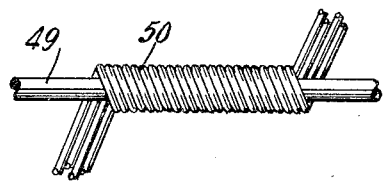
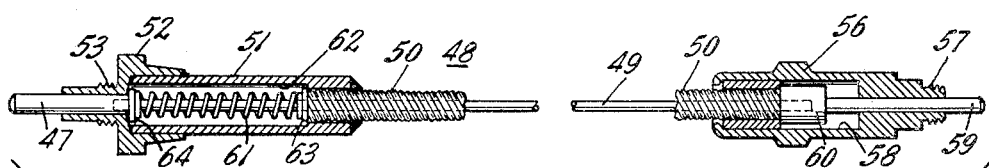
INVENTOR
LYSLE G. TATRO
BY Harold W. Mattingly
ATTORNEY Feb. 20, 1951  L. G. TATRO  2,542,164
FLASH LAMP IGNITER AND SHUTTER SYNCHRONIZER
Filed Aug. 31, 1946  3 Sheets-Sheet 3
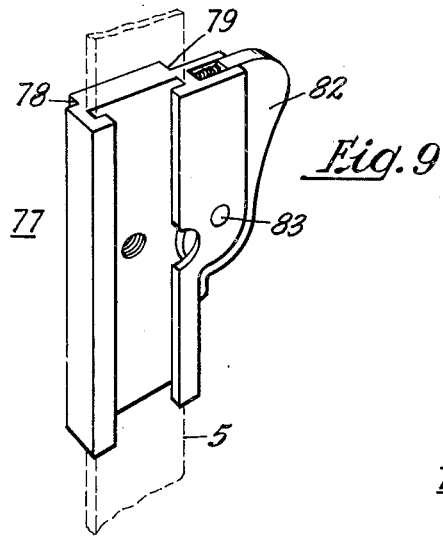
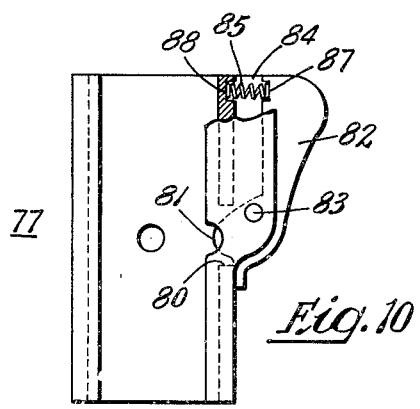
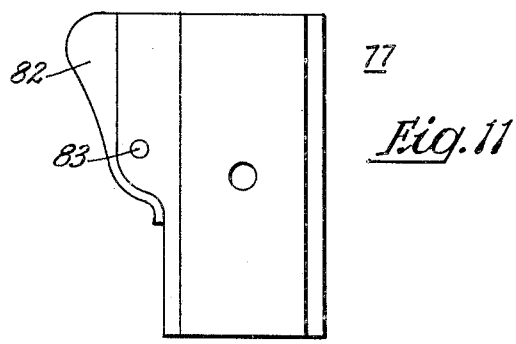
INVENTOR
LYSLE G. TATRO
BY
Harold W. Mattingly
ATTORNEY Patented Feb. 20, 1951

2,542,164

UNITED STATES PATENT OFFICE 2,542,164

FLASH LAMP IGNITER AND SHUTTER SYNCHRONIZER

Lysle G. Tatro, Los Angeles, Calif., assignor to J. B. Wood Corporation, West Los Angeles, Calif., a corporation of California Application August 31, 1946, Serial No. 694,346

3 Claims. (Cl. 95—11.5)

My invention relates to flash lamp igniters and shutter synchronizers for use with cameras and has particular reference to a device of this character which includes an electric generator for supplying the current for igniting the flash lamp.

In the operation of cameras it is the common practice to employ photo flash lamps of the type which when ignited provide a substantially instantaneous intensely brilliant light by which a subject may be readily photographed irrespective of the natural light illuminating the subject. Such flash lamps are usually constructed as a glass envelope in which is located some rapidly combustible material adapted to be ignited by means of a tiny filament of electrical wire brought to incandescence by means of electric current supplied to the filament.

The conventional device for supplying the electric current to ignite such flash lamps includes a suitable case or housing in which is mounted a source of electric current in the form of a dry cell battery with a switch for controlling the circuit between the battery and the flash lamp to be operated by the photographer at the instant of photographing the picture. It frequently occurs, however, that the battery fails and an important photograph is irretrievably lost because of the failure of the battery to supply the necessary current to ignite the flash lamp.

In addition to the foregoing, it is at present the usual practice to attempt to synchronize the opening of the camera shutter with the attainment of peak brilliance by the flash lamp, such synchronization being usually accomplished by interconnecting the switch which is used to ignite the lamp with the trigger which operates the camera shutter and to either arrange for the trigger to be actuated a fraction of a second ahead of or behind the closing of the switch in order that the shutter may be assured of reaching its fully open position within the narrow limits of peak brilliance of the flash lamp.

It is therefore an object of my invention to provide a flash lamp igniting device and camera shutter synchronizer which will not only generate its own electric current for igniting the flash lamp but will also operate to actuate the camera shutter trigger in such synchronization with the ignition of the flash lamp as to insure the opening of the shutter during peak brilliance of the flash lamp.

Another object of my invention is to provide a flash lamp igniting device which is completely self-contained and which does not require any batteries for the supplying of electric current for igniting the flash lamp.

Another object of my invention is to provide a flash lamp igniting device which includes an electric generator for generating the necessary electric current for igniting the flash lamp and in which such generator is so constructed as to always furnish the necessary current for igniting the lamp.

Another object of my invention is to provide a flash lamp igniting device of the character set forth in the preceding paragraphs, in which the generator comprises a dynamo utilizing a rotating element which is adapted to rotate at a speed considerably in excess of that necessary to generate the required voltage for igniting the flash lamp.

Another object of my invention is to provide a device of the character described wherein the movement of the movable element of the generator is so arranged as not to impart any shock to the camera with which it is used.

Another object of my invention is to provide a device of the character set forth in which the rotatable element is mounted upon a shaft by means of a releasable mechanism which will permit the sudden arresting of the rotation of the shaft while permitting the rotatable element of the generator to continue to revolve.

Another object of my invention is to provide a device of the character set forth, in which the rotatable element of the generator is a permanent magnet and wherein the stationary element of the generator carries a winding, permitting connection of the generator to the flash lamp without moving connecting parts.

Another object of my invention is to provide a device of the character set forth, in which the shaft upon which the movable element of the generator is mounted is provided with means for actuating the trigger of the shutter of the camera.

Another object of my invention is to provide a device of the character set forth wherein the shaft carrying the movable element of the generator actuates the camera trigger through the agency of an elongated cable release to thereby minimize the shock imparted to the shutter trigger.

Another object of my invention is to provide a device of the character set forth wherein the cable release is provided with a means for preventing an overriding of the cable.

Another object of my invention is to provide a cable release which will permit the flash lamp igniter to be detached from the camera and yet remain effective to operate the camera shutter.

Another objects of the invtion is to provide a new and novel attachment means by which the igniting device may be attached to the frame of the camera for quick release therefrom.

Other objects and advantages of my invention will be apparent from a study of the following specifications, read in connection with the accompanying drawings, wherein Fig. 1 is a perspective view of a flash lamp igniting device and camera shutter synchronizer constructed in accordance with my invention attached to a typical standard camera;

Fig. 2 is a front elevational view of the igniter and synchronizer shown in Fig. 1;

Fig. 3 is a vertical sectional view taken along line III—III of Fig. 2;

Fig. 4 is a horizontal sectional view taken along line IV—IV of Fig. 3;

Fig. 5 is a horizontal sectional view taken along line V—V of Fig. 3;

Fig. 6 is a horizontal sectional view taken along line VI—VI of Fig. 3;

Fig. 7 is a detail side elevational view of a portion of the cable release employed in the practice of my invention;

Fig. 8 is a longitudinal sectional view taken through the cable release assembly illustrated in Fig. 1;

Fig. 9 is a perspective view of an igniter device attaching mechanism illustrated in Fig. 2;

Fig. 10 is a rear elevational view of the attaching mechanism shown in Fig. 9, a portion of which is broken away to illustrate the internal construction thereof; and Fig. 11 is a front elevational view of the attaching mechanism shown in Figs. 9 and 10.

Referring to the drawings, I have illustrated a typical standard camera at 1 having a shutter 2 equipped with a trigger, not shown but which is adapted to be actuated by a cable release 3.

Attached to one side of the body of the camera 1 is a bracket 4 which may be of any one of the usual bracket constructions comprising a C-shaped strap of metal secured to the body of the camera and providing a vertically extending strip 5 spaced slightly laterally from the adjacent side wall of the camera body or, as is illustrated in Figs. 1 and 2, such bracket is spaced slightly laterally of the range finder or view finder 6 with which the camera may be equipped.

The bracket 5 constitutes a mounting mechanism by which the igniter and synchronizer of my invention, indicated generally by the reference character 7, may be removably secured to the body of the camera 1.

The igniter and synchronizer comprises a shell or housing 8 which is preferably formed in three sections 8a, 8b and 8c assembled together as will be more fully described hereinafter to house the various mechanisms required for the operation of the igniter and synchronizer.

Upon the upper surface of the housing section, I mount a socket 9 into which may be detachably received a flash lamp 10 of well known shape and construction, the socket as illustrated particularly in Fig. 3 having its outer or shell terminal 11 metallically connected to the housing member 8a and thus the shell 11 is grounded to form a part of the ground return circuit to a generator 12 by which electric current is supplied to the flash lamp 10 for igniting the same.

The central terminal 13 of the socket 11 communicates with the interior of the housing section 8a through an aperture 14, through which may pass an electrical conductor 15 to be attached by soldering or otherwise to the central terminal of the socket.

The generator 12 comprises a stationary element or stator 16 and a rotatable element or rotor 17, the stationary element 16 being preferably constructed as a stationary round armature as shown particularly in Figs. 3 and 5. Such round armature member may have the shape of an annular ring 18, from which extends a plurality of radial pole members 19, upon each of which is disposed an energizing coil 20, the coils on all of the poles being connected in series relation by suitable conductors (not shown) in the manner generally employed in the construction of field windings on generators and motors. One end of the winding assembly is connected by means of a conductor 21 to the metal of the housing section 8b in any suitable manner as by means of a terminal screw 22 while the opposite end of the winding assembly is connected to the conductor 15 which, it will be recalled, extends to and is electrically connected to the central terminal of the socket 9.

The rotatable element 17 of the generator 12 is constructed in the form of a disk of magnetic material having the characteristic of being a permanent magnet, the edge of the disk having a plurality of notches 23 distributed about the circumference of the disk to divide the same into a plurality of poles, the number of which corresponds to the number of poles 19 on the stationary element of the generator. The movable element disk is press-fitted upon a bushing 24 which is rotatably mounted upon a shaft 25 which extends vertically through the housing members 8a, 8b and 8c and is journaled for rotation therein by bearing apertures 26 and 27 in the upper wall of the housing 8b and the upper wall of the housing 8c, respectively.

By referring particularly to Figs. 3 and 5, it will be observed that the lower end of the bushing 24 is formed on an enlarged diameter and is counter-bored as indicated at 28 to constitute one element of an over-riding clutch, the other element 29 of which comprises a disk pinned to the shaft 25, a portion of the peripheral edge of the disk 29 being cut away to provide a cam surface along which a clutch ball 30 may ride urged into wedging relation between the disk 29 and the bushing 24 by means of a spring 31.

The upper end of the shaft 25 has pinned thereto, as indicated at 32, a bushing 33 to which is secured one end of a spiral spring 34, the other end of which is secured to some stationary portion of the top wall of the housing section 8b.

The lower end of the shaft bushing 33 is formed with a radially extending flange 35 which, as will be observed from an inspection of Fig. 4, has a radially projecting finger 36 which forms a dog engageable by means of a trigger 37 when the shaft has been rotated in the direction of the arrow on Fig. 4 from its normal position through approximately a single revolution to wind up the spring 32.

The trigger 37 is mounted for horizontal sliding movement upon a pair of screws 38 and 39 which extend, respectively, through a pair of slots 40 and 41 in the trigger 37 and secure the trigger to the upper wall of the housing section 8b. One end of the trigger 37 extends outwardly of the housing section 8a and is up-turned or otherwise formed to provide a fingerpiece 42 to be engaged by the fingers of the person operating the igniting device.

As thus far described it will be apparent that by grasping a knob 43 on the lower end of the shaft 25 and imparting substantially a single revolution to the shaft, the rotation of the shaft will wind up the spring 34 and will place the finger 36 behind the trigger 37, holding the spring under tension until the fingerpiece 42 is operated to release the dog 36. Upon the release of the dog 36 the spring will impart a rapid rotation to the shaft 25 which, through the agency of the over-riding clutch 24, 29, 30 and 31, will cause the rotatable element 17 of the generator to rotate rapidly within the wound stationary armature, generating a relatively high voltage which will be impressed across the terminals 11 and 13 of the lamp receiving socket 9 and the flash lamp 10, igniting the flash lamp.

When the shaft 25, under the influence of the spring 34, has rotated in a counterclockwise direction as viewed in Fig. 4 through substantially a single revolution, the shaft is brought to rest by the engagement of the dog 36 against a cushion stop 44 which preferably includes rubber or similar material buffer 45 for absorbing any shock and preventing the transmission of shock to the camera to which the igniting device is attached. However, even though the shaft 25 is brought abruptly to rest, the over-riding clutch will permit the greater mass of the generator disk element 17 to continue to rotate by its own inertia until it comes to rest under the influence of friction.

Thus while the rotatable element of the generator may be constructed of material having mass and dimensions sufficient to insure ruggedness of construction, no inertia shocks of any appreciable extent are permitted to be transmitted to the camera.

While as thus far described the igniting device will operate to fire or ignite a flash lamp without also operating the camera shutter, the automatic operation of the camera shutter and the synchronization thereof with the igniting of the flash lamp may be readily accomplished by securing to the lower end of the shaft 25 a shutter operating cam 46 which is adapted to operate the cable plunger 47 of a cable release indicated generally by the reference character 48.

A cable release of novel construction is illustrated particularly in Fig. 8 as comprising an inner flexible cable member 49 enclosed within a metallic flexible sheath or housing 50. At one end of the housing 50 there is secured a coupling element 51, one end 52 of which is provided with a threaded boss 53 adapted to be screwed into a threaded opening 54 in one of the side walls of the lower housing member 8c. The cable 49 has one of its ends secured as by welding, braizing or soldering to a cable actuating plunger 47 which projects through the boss 53 and into engagement with the peripheral surface of the cam 46.

The other end of the sheath 50 is secured to a coupling member 56, one end of which has a threaded boss 57 adapted to be screwed into the cable release socket on the camera shutter. The coupling member 56 is counter-bored as indicated at 58 to receive a trigger operating plunger 59 which projects through the boss 57 to engage the shutter trigger on the camera shutter.

Within the counter-bore 58 the plunger 59 is provided with an enlarged head 60 to which is secured the other end of the cable 49.

The cable 49 is normally urged away from shutter operating position by means of a spring 61 which surrounds the cable 49 and has one of its ends abutting the end of a counter-bore 62 formed in the coupling member 51 while the other of its ends abuts the plunger 47, washers indicated at 63 and 64 being preferably disposed at each end of the spring 61.

When the cam 46 is moved in the direction of the arrow on Fig. 6 from the full line position shown in that figure (the igniter "cocked" position) to the dotted line position, the high point on the cam 46 will have engaged the plunger 47 and pressed the cable 49 to its shutter trigger releasing position.

In order to prevent any possible injury to the camera shutter or its trigger, the plunger 59 is limited in its outward movement by the engagement of the enlarged head 60 with the end of the counter-bore 58 so that irrespective of the amount of movement which may be imparted to the cable 49 the plunger 59 can only move through a predetermined distance. This is particularly important since it is extremely desirable to use a relatively long cable release 48, as will be more fully described hereinafter, and it is therefore desirable to provide a length of movement for the cable 49 somewhat in excess of the length of movement permitted the plunger 59 to compensate for any yielding or elongation of the cable housing 50 and any lateral movement of the cable 49 within its housing 50.

By referring particularly to Fig. 7, it will be observed that the cable housing 50 is of novel construction in that instead of being formed of a single length of wire it is formed of a single layer of four wires wound helically together. Thus the cable sheath is provided with all of the flexibility of a single wire sheath while resistance to elongation is materially increased due to the fact that the cable is in effect constructed of four separate helical springs (one formed by each of the wires).

To adjust the shutter opening with extreme accuracy of synchronization with the attainment of peak brilliance by the flash lamp, the cam 46 is adjustably attached to the shaft 25 as by securing a bushing 66 to the shaft 25 and mounting the cam 46 by means of screws 67 passing through elongated arcuate slots 68 in the cam 46. Thus the cam 46 may be adjusted to any desired position fitted to the particular camera with which the igniter is to be used.

In order to permit the same igniting device to be employed for firing not only the flash lamp in the socket 9 but also other flash lamps located at remote points, I prefer to provide an electrical connection 69 on one of the side walls of the lower housing member 8c as by mounting a pair of electrical terminal pins 70 and 71 upon an insulating block 72 secured to the side wall of the housing member 8c, one of the terminal pins 70 being connected to the conductor 15 while the other of the pins 71 is connected to a ground screw 73 as indicated particularly in Fig. 6.

The mounting of the igniter and synchronizing device upon the camera may be accomplished in any desired fashion though I prefer to employ a mounting bracket 75 secured to the housing members 8b and 8c as indicated in Fig. 2, the mounting bracket having a thumb screw 76 mounted thereon adapted to be threaded into the sockets usually provided upon the cases of cameras for the attachment of various photographic devices to be used therewith.

Thus the igniting and synchronizing device may be readily attached to the camera or detached therefrom which is a considerable advantage when it is desired to hold the flash lamp at some distance away from the camera case in the making of certain types of photographs. It will be recalled that the cable 48 was stated as being preferably of considerable length which would permit the detachment of the igniting and synchronizing device from the camera case without disconnecting the cable release and thus even though the igniting and synchronizing device is held at arm's length from the camera case it will still function to accurately synchronize the operation of the shutter with the operation of the flash lamp.

To facilitate the rapid attachment and detachment of the igniting and synchronizing device to the camera case, I prefer to provide a quick detachable connector illustrated particularly in Figs. 2, 9, 10 and 11 and indicated generally by the reference character 77. The connector preferably comprises an elongated block of metal or other suitable material, the front face of which is undercut as indicated at 78 and 79 to provide a pair of vertical trackways adapted to engage vertical guides (not shown) in the mounting bracket 75.

The rear face of the connector 77 is formed with an elongated T-slot adapted to slide over the mounting bracket 5 attached to the camera case, one of the legs of the T-slot being cut away as indicated at 80 to permit the projection therethrough of a cam 81 formed upon a fingerpiece 82 pivoted as indicated at 83 to one side of the connector 77. The fingerpiece 82 moves within a slot 84 but is normally urged toward its outermost position by means of a spring 85, the ends of which are seated in sockets 87 and 88 formed, respectively, in the fingerpiece and the connector body. By properly shaping the cam 81, it will be apparent that the cam will engage the side edge of the mounting bracket 5 with sufficient friction to hold the igniting and synchronizing device securely upon the camera but by pressing the fingerpiece inwardly this grip will be released, permitting the ready sliding of the connector with the igniting and synchronizing device from engagement with the bracket 5 and permitting its use somewhat remote from the camera.

It will be apparent from the foregoing that I have provided a self-contained igniting and synchronizing device wherein the igniting device comprises its own source of electrical energy for igniting the flash lamp and that the igniting device will function to operate the camera shutter at exactly the right time to insure that the shutter is open during the period of peak brilliance of the flash lamp.

While I have shown and described the preferred embodiment of my invention, I do not desire to be limited to any of the details of construction shown and described herein, except as defined in the appended claims.

I claim:

1. In a flash lamp igniter including a shutter releasing means operable to actuate a camera shutter, an impulse generator comprising a housing; a shaft in said housing; means mounting said shaft for rotation; stop means on said shaft and on said housing limiting the rotation of said shaft to approximately one revolution from an initial position to a final position; means on said shaft for operating said shutter releasing means at a predetermined point in said one revolution of said shaft; a spring directly interconnecting said shaft and said housing to be tensioned by rotation of said shaft to said initial position for imparting to said shaft a rapid rotation to said final position; an electric generator rotor mounted on said shaft for free rotation relative thereto; and an over-riding clutch interposed between said rotor and said shaft for driving said rotor from said shaft when said shaft is rotated toward said final position, whereby said rotor may freely rotate when said shaft is stopped in said final position to thereby minimize inertia shocks to said housing.

2. In a flash lamp igniter including a shutter releasing means operable to actuate a camera shutter, an impulse generator comprising a housing; a shaft in said housing; means mounting said shaft for rotation; cooperating stop means on said shaft and on said housing limiting the rotation of said shaft to approximately one revolution from an initial position to a final position; means on said shaft for operating said shutter releasing means at a predetermined point in said one revolution of said shaft; a spring directly interconnecting said shaft and said housing to be tensioned by rotation of said shaft to said initial position for imparting to said shaft a rapid rotation to said final position; trigger means normally engaging said stop means on said shaft for restraining said shaft in said initial position and releasable to allow said spring to rotate said shaft to said final position; an electric generator rotor mounted on said shaft for free rotation relative thereto; and an over-riding clutch interposed between said rotor and said shaft for driving said rotor from said shaft when said shaft is rotated toward said final position, whereby said rotor may freely rotate when said shaft is stopped in said final position to thereby minimize inertia shocks to said housing.

3. In a flash lamp igniter including a shutter releasing means operable to actuate a camera shutter and a cam for operating said releasing means, an impulse generator comprising a housing; a shaft in said housing; means mounting said shaft for rotation; stop means on said shaft and on said housing limiting the rotation of said shaft to approximately one revolution from an initial position to a final position; mounting means securing said cam to said shaft, said mounting means including means for adjusting the angular position of said cam relative to said shaft to thereby adjust the point in said one revolution of said shaft at which said shutter releasing means is operated; a spring directly interconnecting said shaft and said housing to be tensioned by rotation of said shaft to said initial position for imparting to said shaft a rapid rotation to said final position; an electric generator rotor mounted on said shaft for free rotation relative thereto; and an over-riding clutch interposed between said rotor and said shaft for driving said rotor from said shaft when said shaft is rotated toward said final position, whereby said rotor may freely rotate when said shaft is stopped in said final position to thereby minimize inertia shocks to said housing.

LYSLE G. TATRO.

(References on following page)

REFERENCES CITED

The following references are of record in the file of this patent:

UNITED STATES PATENTS

| Number | Name | Date |
|---|---|---|
| 618,551 | Winslow et al. | Jan. 31, 1899 |
| 1,072,511 | Schaffler et al. | Sept. 9, 1913 |
| 1,416,513 | Rosengart | May 16, 1922 |
| 1,670,419 | Mayer | May 22, 1928 |
| 2,171,743 | Edwards | Sept. 5, 1939 |
| 2,205,648 | Fischer | June 25, 1940 |
| 2,261,073 | Painter | Oct. 28, 1941 |
| 2,261,953 | Brown | Nov. 11, 1941 |
| 2,299,497 | Rosenthal | Oct. 20, 1942 |
| 2,321,945 | Schwartz et al. | June 15, 1943 |
| 2,322,067 | Soreny | June 15, 1943 |
| 2,468,146 | Vissing | Apr. 26, 1949 |